UNITED STATES PATENT OFFICE.

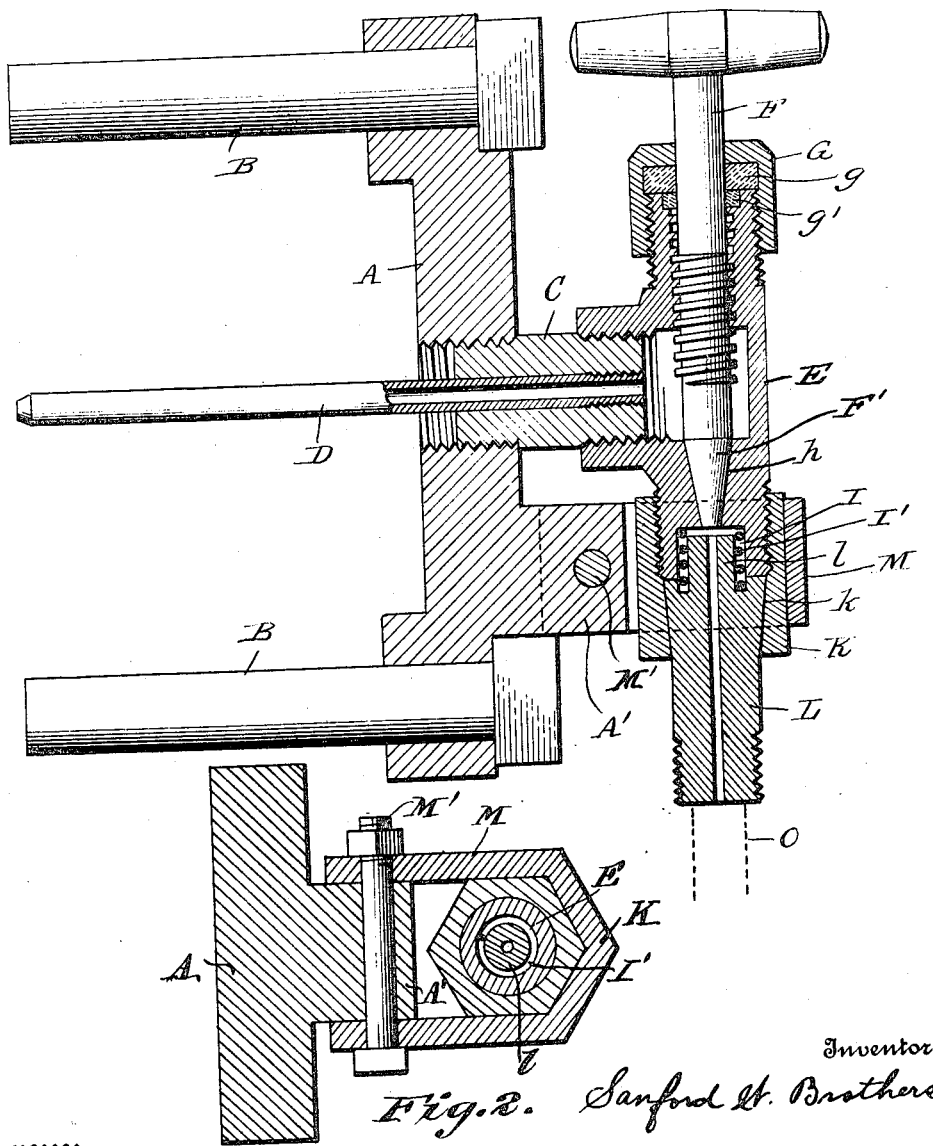

SANFORD W. BROTHERS, OF DENVER, COLORADO.

VALVED CONNECTION FOR ROCK-DRILLS.

1,075,324.

Specification of Letters Patent.   Patented Oct. 14, 1913.

Application filed February 3, 1911.   Serial No. 606,411.

*To all whom it may concern:*

Be it known that I, SANFORD W. BROTHERS, a citizen of the United States, residing at Denver, in the county of Denver and State of Colorado, have invented certain new and useful Improvements in Valved Connections for Rock-Drills; and I do hereby declare the following to be a full, clear, and exact description of the same, reference being had to the accompanying drawings, forming a part of this specification, and to the figures and letters of reference marked thereon.

The present invention has for its object to provide an improved form of valved connection through which water is supplied to the modern elastic fluid-operated rock drills, the water supply being in communication with the steel or tool and through it discharging into the opening being formed thereby and in connection with the exhaust or a suitable air supply from the pressure system serving to clear the opening of debris.

Referring to the accompanying drawings,—Figure 1 is a sectional view taken through the head of a rock drill and showing the valved water supply connections of the present invention; Fig. 2 is a horizontal cross section through M—M', showing the arrangement and form of the clip and coupling.

Like letters of reference in the several figures indicate the same parts.

The letter A indicates the head or rear cap of a rock drill which latter may be of the construction heretofore patented by me. The head is adapted to be held in place by long rods or bolts indicated at B in said drawing. At one side of the center the head A is formed with a lug or bracket A', and at the center with a threaded aperture into which one end of a nipple C is adapted to be seated. Secured in the nipple C and projecting into the drill so as to coöperate with a passage through the hammer is a tube D through which the water passes into the drill and through the latter into the drill steel, all as is well known in the art.

The nipple C before referred to is threaded at its outer end and adapted for the reception of a threaded boss on the body E of the valve. The valve body E has its major axis transverse of the nipple C, and at one end is internally threaded for the reception of a threaded valve stem F adapted to work through a packing gland inclosed by the cap G threaded on the outside of the end of the valve body. In the preferred construction, the packing itself is in the form of two washers, one, indicated by the letter *g*, overlying the end of the body of the valve, and the other, indicated by the letter *g'*, seated in a recess in the end of the valve body immediately around the valve stem, so as to prevent the ingress of dirt or the escape of water from the body.

The opposite end of the valve body is formed with an inwardly opening conical seat *h* into which the tapered end F' of the valve stem passes, and by means of which the quantity of water admitted may be accurately regulated. It is to be noted however that the opening into the tapering seat or passageway is relatively large at its smaller end, whereby the lodgment of dirt therein is avoided, as will be hereinafter more particularly pointed out. The end of the body of the valve containing the seat is externally threaded for the reception of a clamping nut K which at its outer end is formed with an internal tapering seat *k* for the reception of a correspondingly tapered end of a nipple L. The nipple L is at its inner or larger end provided with a projection or extension *l* terminating at a point in proximity to the entrance opening of the valve seat, and the chamber I around said projection is adapted for the reception of a coiled spring I' to hold the tapering nipple seated with sufficient pressure to prevent the escape of water, but at the same time permit the said nipple to swivel in the nut or coupling K, whereby the angular position of the drill with relation to the water pipe connection may be varied at will without unduly straining the valve or parts associated therewith. To overcome any possibility of the strain which may be transmitted through the water pipe, injuring or loosening the parts, as well as to prevent any possible displacement of said parts due to the excessive vibration to which they are subjected in the use of the drill, the coupling K is housed and preferably clamped in a clip M, shown in Fig. 2. Said clip is held in place by a bolt M' passing through its ends and through an aperture in the lug or bracket A' on the drill head.

In the preferred construction, provision is made whereby the entry of dirt into the valve and drill through the water pipe connections is prevented, by making the opening or bore of the swivel nipple relatively small, as compared with the internal diameter of the waterpipe connection indicated by the dotted line O in Fig. 1. The aperture through the swivel nipple is in effect the smallest aperture through which the water passes on its way from the water pipe connection to the opening, being formed by the drill steel, and consequently dirt which will enter through the swivel nipple may find a free exit through the other connections, and such dirt as will not enter is readily discharged by detaching the water pipe connection. In practice it will be discharged whenever said connections are detached for the purpose of changing the position of the drill, as will be readily understood.

The advantages of the construction will be readily appreciated when it is remembered that the device is intended for use in mines and under conditions where it must be subjected at practically all times while in operation to the action of grit and dirt of all kinds, as well as to the action of water which necessarily carries a large quantity of grit and dirt. The construction is not only simple and exceedingly effective in that it does not cause the drill to be hampered by the water pipe connections and permits of a most accurate and ready control of the water supply so that it may be properly proportioned to the air or exhaust from the drill to effectually clear the drill hole of the matter loosened by the action of the drill itself.

Having thus described my invention, what I claim and desire to secure by Letters Patent of the United States, is:

1. The combination with a rock drill head having a central threaded port and a lug projecting at one side of the port, of a nipple mounted in the port and a valve carried thereby, said valve provided with a recess at its inlet end, an inlet fitting for said valve comprising a tapered swivel nipple having a central elongation projecting within a recess in the valve body, a spring encircling the elongation and in contact with the walls of the recess, a coupling engaging the valve body and having a seat for the tapered nipple; and a clip carried by the lug and coöperating with the coupling to lock the parts in position.

2. The combination with a rock drill head having a central threaded aperture, and a lug projecting at one side of said aperture, of a nipple mounted in the aperture, a valve body mounted on the nipple and having a valve stem arranged transversely to said nipple, a swivel nipple and coupling connecting said nipple with the valve body and a clip inclosing said coupling and connected with the lug on the drill head whereby the coupling and valve body are securely held in position, substantially as described.

SANFORD W. BROTHERS.

Witnesses:
ORVILLE W. BROTHERS,
RALPH W. ECKHARDT.